United States Patent
Park et al.

(10) Patent No.: US 10,916,081 B2
(45) Date of Patent: *Feb. 9, 2021

(54) BUILDING MANAGEMENT SYSTEM WITH IDENTITY MANAGEMENT AND ASSURANCE SERVICES

(71) Applicant: Johnson Controls Technology Company, Auburn Hills, MI (US)

(72) Inventors: Youngchoon Park, Brookfield, WI (US); Sudhi R. Sinha, Milwaukee, WI (US); Erik S. Paulson, Madison, WI (US); Peter A. Ainsworth, Oxfordshire (GB); Anne Gallagher, Belfast (GB)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,644

(22) Filed: Mar. 10, 2020

(65) Prior Publication Data

US 2020/0211308 A1    Jul. 2, 2020

Related U.S. Application Data

(63) Continuation of application No. 16/142,472, filed on Sep. 26, 2018, now Pat. No. 10,600,263.

(Continued)

(51) Int. Cl.
*G07C 9/25* (2020.01)
*G06F 8/65* (2018.01)
(Continued)

(52) U.S. Cl.
CPC ............... *G07C 9/253* (2020.01); *G06F 8/65* (2013.01); *G06F 16/288* (2019.01);
(Continued)

(58) Field of Classification Search
None
See application file for complete search history.

(56) References Cited

U.S. PATENT DOCUMENTS

| 7,552,467 | B2 | 6/2009 | Lindsay |
| 8,941,465 | B2 | 1/2015 | Pineau et al. |

(Continued)

FOREIGN PATENT DOCUMENTS

WO    WO-2017/035536 A1    3/2017

OTHER PUBLICATIONS

International Search Report and Written Opinion on PCT/US2018/052975, dated Jan. 2, 2019, 13 pages.

*Primary Examiner* — K. Wong
(74) *Attorney, Agent, or Firm* — Foley & Lardner LLP

(57) ABSTRACT

A building management system includes an entity database that stores a plurality of interconnected smart entities. The smart entities include object entities representing a plurality of people or physical devices and data entities representing data associated with the people or physical devices. The smart entities are interconnected by relational objects indicating relationships between the object entities and the data entities. Each of the object entities includes a plurality of stored identity attributes. An identity management service is configured to receive a first identity attribute from a first device within a building, receive a second identity attribute from a second device within the building, compare the first and second identity attributes to the stored identity attributes of an object entity of the plurality of interconnected smart entities, and allow access to at least one of a building space, a device of building equipment, or a computer system.

20 Claims, 8 Drawing Sheets

Related U.S. Application Data

(60) Provisional application No. 62/564,247, filed on Sep. 27, 2017, provisional application No. 62/580,867, filed on Nov. 2, 2017, provisional application No. 62/611,974, filed on Dec. 29, 2017, provisional application No. 62/611,984, filed on Dec. 29, 2017.

(51) Int. Cl.
| | | |
|---|---|---|
| *G06F 16/28* | (2019.01) | |
| *G07C 9/00* | (2020.01) | |
| *G06Q 50/16* | (2012.01) | |
| *G07C 9/27* | (2020.01) | |

(52) U.S. Cl.
CPC ....... *G06Q 50/163* (2013.01); *G07C 9/00563* (2013.01); *G07C 9/00571* (2013.01); *G07C 9/257* (2020.01); *G07C 9/27* (2020.01)

(56) References Cited

U.S. PATENT DOCUMENTS

| | | | |
|---|---|---|---|
| 9,524,594 | B2 | 12/2016 | Ouyang et al. |
| 9,948,359 | B2 | 4/2018 | Horton |
| 10,454,927 | B2 * | 10/2019 | Oberhauser ............. G07C 9/32 |
| 10,600,263 | B2 * | 3/2020 | Park ...................... G06Q 50/163 |
| 2015/0156031 | A1 | 6/2015 | Fadell et al. |
| 2017/0090437 | A1 | 3/2017 | Veeramani et al. |
| 2017/0103327 | A1 | 4/2017 | Penilla et al. |

\* cited by examiner

BUILDING MANAGEMENT SYSTEM WITH IDENTITY MANAGEMENT AND ASSURANCE SERVICES

CROSS-REFERENCE TO RELATED PATENT APPLICATIONS

This application is a continuation of U.S. patent application Ser. No. 16/142,472, filed Sep. 26, 2018, which claims the benefit of and priority to U.S. Provisional Patent Application No. 62/564,247, filed Sep. 27, 2017, U.S. Provisional Patent Application No. 62/580,867, filed Nov. 2, 2017, U.S. Provisional Patent Application No. 62/611,974, filed Dec. 29, 2017, and U.S. Provisional Patent Application No. 62/611,984, filed Dec. 29, 2017. Each of these patent applications are incorporated by reference herein in their entireties.

BACKGROUND

The present disclosure relates generally to identity management and/or assurance services. In some embodiments, the present disclosure relates to identity management and/or assurance services for building management systems. In some such embodiments, the present disclosure relates to a timeseries services platform for a building management system. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS can collect data from sensors and other types of building equipment. Data can be collected over time and combined into streams of timeseries data. Each sample of the timeseries data can include a timestamp and a data value. Some BMSs store raw timeseries data in a relational database without significant organization or processing at the time of data collection. Applications that consume the timeseries data are typically responsible for retrieving the raw timeseries data from the database and generating views of the timeseries data that can be presented via a chart, graph, or other user interface. These processing steps are typically performed in response to a request for the timeseries data, which can significantly delay data presentation at query time.

SUMMARY

One implementation of the present disclosure is a building management system including an entity database and an identity management service. The entity database stores a plurality of interconnected smart entities. The smart entities include object entities representing a plurality of people or physical devices and data entities representing data associated with the people or physical devices. The smart entities are interconnected by relational objects indicating relationships between the object entities and the data entities. Each of the object entities includes a plurality of stored identity attributes. The identity management service is configured to receive a first identity attribute from a first device within a building, receive a second identity attribute from a second device within the building, compare the first and second identity attributes to the stored identity attributes of an object entity of the plurality of interconnected smart entities, and allow access to at least one of a building space, a device of building equipment, or a computer system in response to the first and second identity attributes matching the stored identity attributes of the object entity.

In some embodiments, the first device is an access card reader and the first identity attribute is a card ID attribute recorded by the access card reader. In some embodiments, the second device is a security camera and the second identity attribute is an image of a person captured by the security camera.

In some embodiments, the first device is an access card reader and the first identity attribute is a card ID attribute recorded by the access card reader. In some embodiments, the second device is a mobile device carried by a person and the second identity attribute is a mobile device ID attribute associated with the mobile device.

In some embodiments, the first device is a user interface device and the first identity attribute is a user identifier received from a user via the user interface device. In some embodiments, the second device is a security camera and the second identity attribute is an image of a person captured by the security camera.

In some embodiments, the first device is a user interface device and the first identity attribute is a user identifier received from a user via the user interface device. In some embodiments, the second device is a mobile device carried by a person and the second identity attribute is a mobile device ID attribute associated with the mobile device.

In some embodiments, the first device is one of a mobile device, an information technology (IT) device, an internet of things (IoT) sensor, a building equipment device, or a security device. In some embodiments, the second device is another of the mobile device, the IT device, the IoT sensor, the building equipment device, or the security device.

In some embodiments, the identity management service is configured to determine a location associated with the first device in response to the first device providing the first identity attribute, identify a building space in which the first device is located, and select the second device from a set of devices located in the same building space as the first device.

In some embodiments, the identity management service is configured to deny access to at least one of the building space, the device of building equipment, or the computer system in response to at least one of the first and second identity attributes not matching the stored identity attributes of the object entity.

Another implementation of the present disclosure is a method for controlling access to a building space, a device of building equipment, or a computer system in a building management system. The method includes storing a plurality of interconnected smart entities in an entity database. The smart entities include object entities representing a plurality of people or physical devices and data entities representing data associated with the people or physical devices. The smart entities are interconnected by relational objects indicating relationships between the object entities and the data entities. Each of the object entities includes a plurality of stored identity attributes. The method further includes receiving a first identity attribute from a first device within a building, receiving a second identity attribute from a second device within the building, comparing the first and second identity attributes to the stored identity attributes of an object entity of the plurality of interconnected smart entities, and allowing access to at least one of a building space, a device of building equipment, or a computer system in response to the first and second identity attributes matching the stored identity attributes of the object entity.

In some embodiments, the first device is an access card reader and the first identity attribute is a card ID attribute recorded by the access card reader. In some embodiments, the second device is at least one of a security camera or a mobile device carried by a person and the second identity attribute is at least one of an image of a person captured by the security camera or a mobile device ID attribute associated with the mobile device.

In some embodiments, the first device is a user interface device and the first identity attribute is a user identifier received from a user via the user interface device. In some embodiments, the second device is at least one of a security camera or a mobile device carried by a person and the second identity attribute is at least one of an image of a person captured by the security camera or a mobile device ID attribute associated with the mobile device.

In some embodiments, the method includes determining a location associated with the first device in response to the first device providing the first identity attribute, identifying a building space in which the first device is located, and selecting the second device from a set of devices located in the same building space as the first device.

Another implementation of the present disclosure is a building management system including a plurality of devices of building equipment, an entity database, and an assurance service. The entity database stores a plurality of interconnected smart entities. The smart entities include object entities representing the plurality of devices of building equipment and data entities representing data associated with the plurality of devices of building equipment. The smart entities are interconnected by relational objects indicating relationships between the object entities and the data entities. Each object entity includes a stored attribute indicating a version of software installed on a device of the building equipment represented by the object entity. The assurance service is configured to automatically detect a version of software installed on each of the devices of building equipment by reading the stored attributes of the object entities and automatically update the software installed on one or more of the devices of building equipment in response to a determination that the version of software installed on the one or more of the devices of building equipment is not a latest version of the software.

In some embodiments, the assurance service includes an identity and security service configured to ensure that each device of the building equipment is able to access configuration backups.

In some embodiments, the assurance service includes a device management service configured to create a smart entity for each device of the building equipment and register each device of the building equipment with the corresponding smart entity.

In some embodiments, the assurance service includes a transportation and messaging service configured to facilitate bidirectional communications between the assurance service and the building equipment.

In some embodiments, the assurance service includes a device shadow/manifest service configured to synchronize at least one of configuration settings, parameters, or device-specific information between the building equipment and the assurance service.

In some embodiments, the assurance service includes a package service configured to create a compressed data object including a configuration of the building equipment and store the compressed data object as a backup of the configuration.

In some embodiments, the assurance service includes an asset and backup service configured to generate and present a user interface that lists each device of the building equipment and indicates whether a backup configuration of each device has been stored at the assurance service.

In some embodiments, the assurance service includes a manual upload service configured to upload a backup configuration in response to a user request for the backup configuration.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Building HVAC Systems and Building Management Systems

Figure 1:
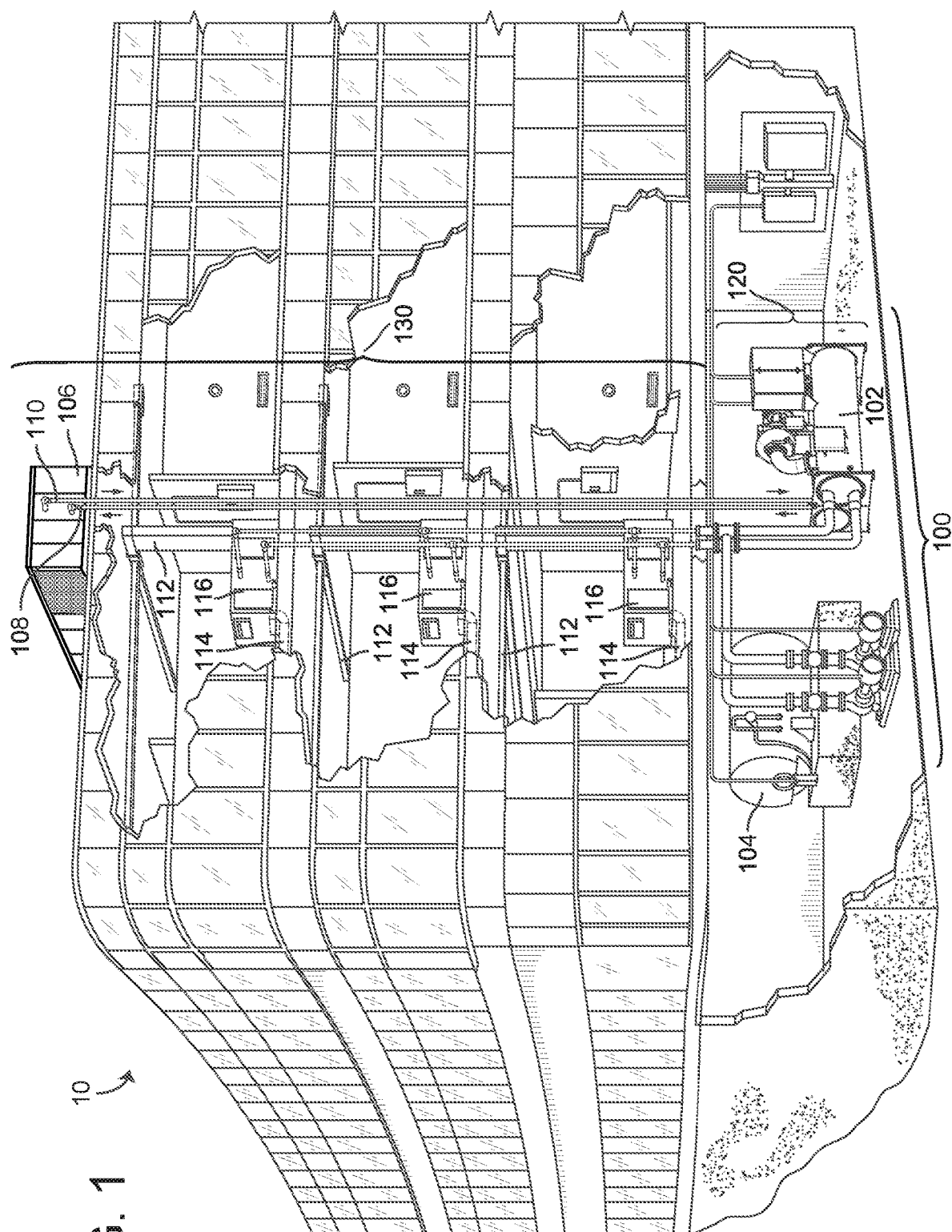
FIG. 1 is a drawing of a building equipped with a building management system (BMS) and a HVAC system, according to some embodiments.
Figure 2:
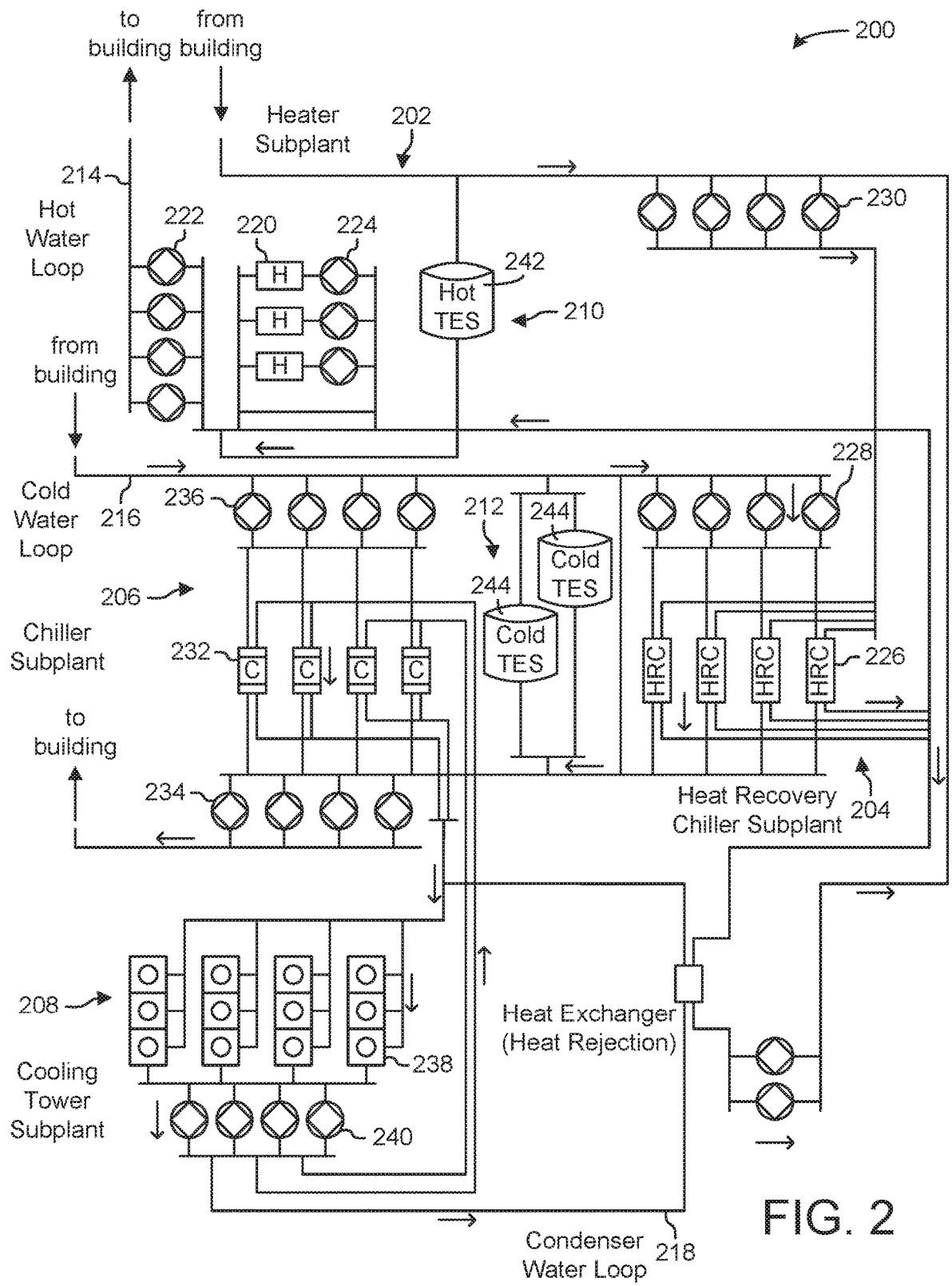
FIG. 2 is a schematic of a waterside system which can be used as part of the HVAC system of FIG. 1, according to some embodiments.
Figure 3:
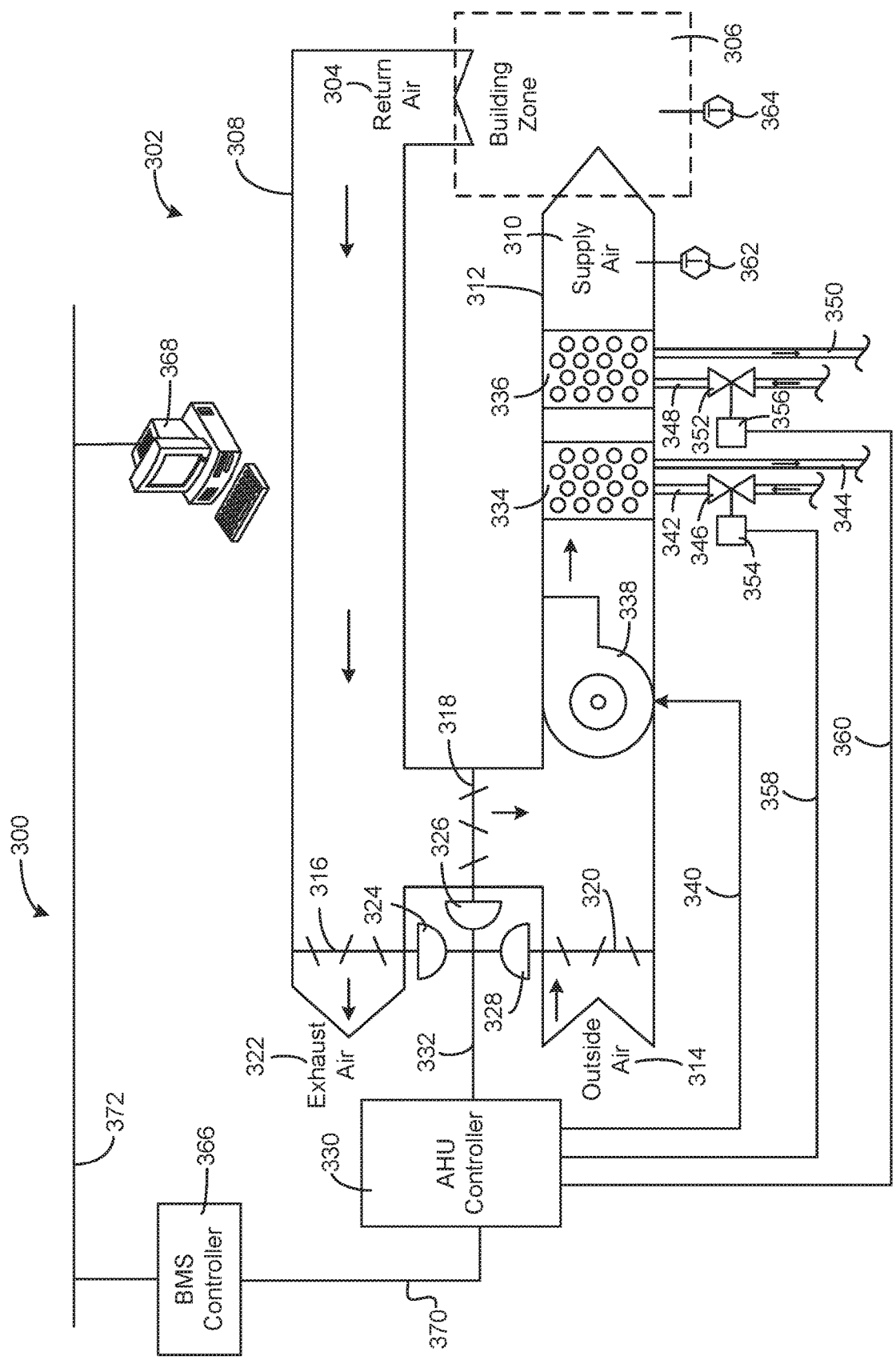
FIG. 3 is a block diagram of an airside system which can be used as part of the HVAC system of FIG. 1, according to some embodiments.
Figure 4:
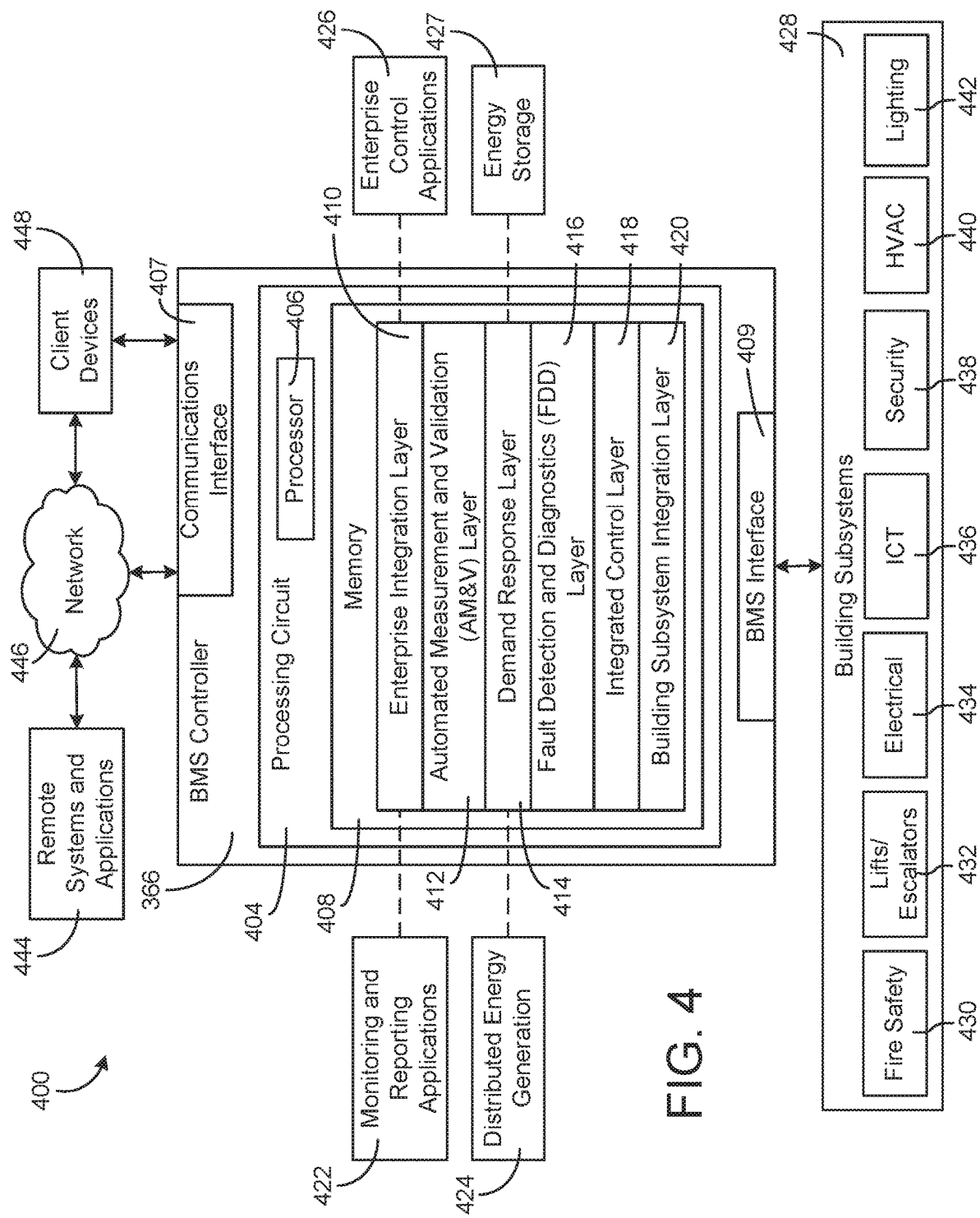
FIG. 4 is a block diagram of a BMS which can be used in the building of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management System

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System with Data Platform Services

Figure 5:
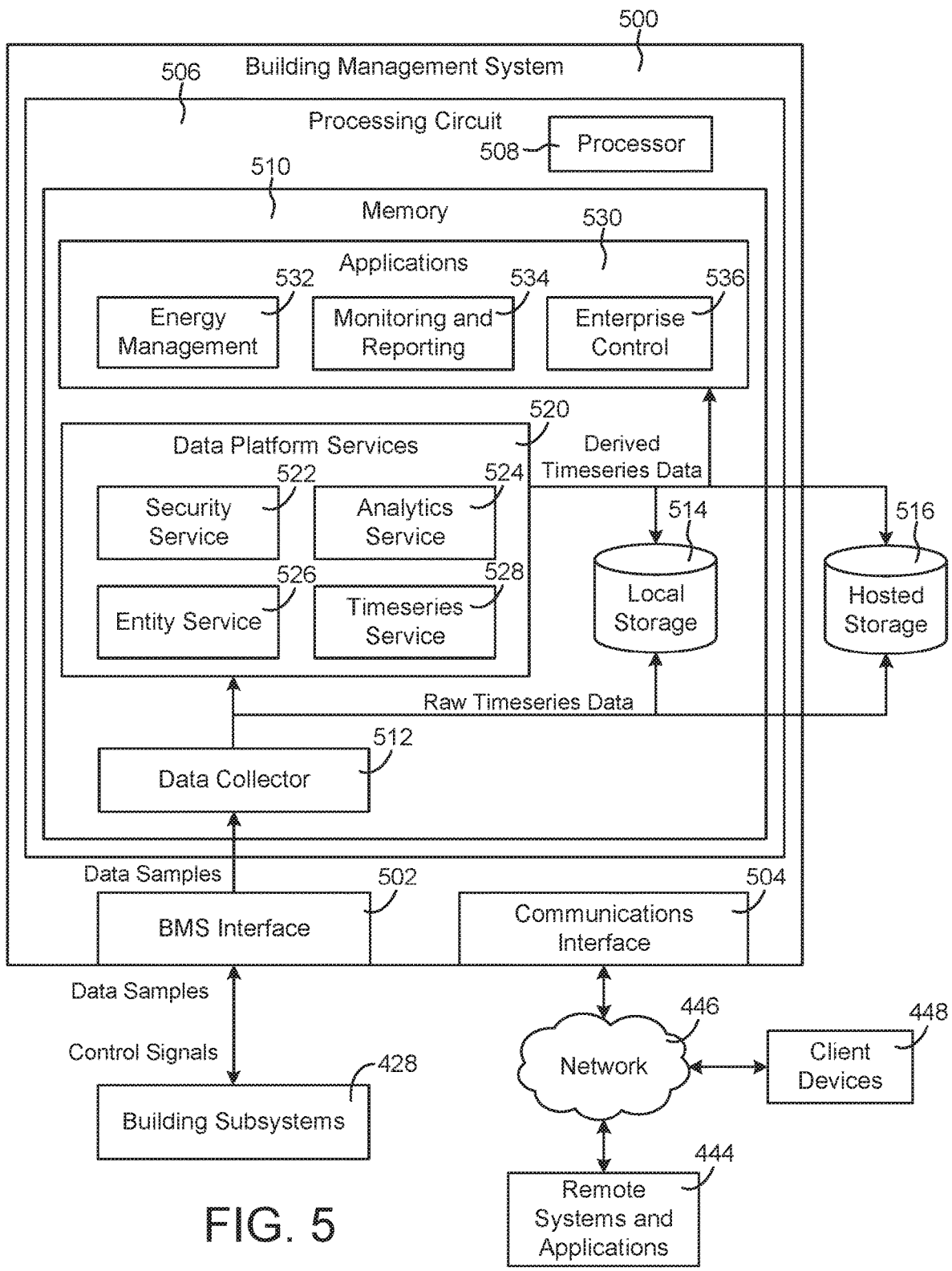
FIG. 5 is a block diagram of another BMS which can be used in the building of FIG. 1, including a data collector, data platform services, applications, and a dashboard layout generator, according to some embodiments.

Referring now to FIG. 5, a block diagram of another building management system (BMS) 500 is shown, according to some embodiments. BMS 500 can be configured to collect data samples from building subsystems 428 and generate raw timeseries data from the data samples. BMS 500 can process and transform the raw timeseries data using data platform services 520 to generate derived timeseries data. Throughout this disclosure, the term "derived timeseries data" is used to describe the result or output of a transformation or other timeseries processing operation performed by data platform services 520 (e.g., data aggregation, data cleansing, virtual point calculation, etc.). The derived timeseries data can be provided to various applications 530 and/or stored in local storage 514 or hosted storage 516 (e.g., as materialized views of the raw timeseries data). In some embodiments, BMS 500 separates data collection; data storage, retrieval, and analysis; and data visualization into three different layers. This allows BMS 500 to support a variety of applications 530 that use the derived timeseries data and allows new applications 530 to reuse the existing infrastructure provided by data platform services 520.

Before discussing BMS 500 in greater detail, it should be noted that the components of BMS 500 can be integrated within a single device (e.g., a supervisory controller, a BMS controller, etc.) or distributed across multiple separate systems or devices. For example, the components of BMS 500 can be implemented as part of a METASYS® brand building automation system, as sold by Johnson Controls Inc. In other embodiments, some or all of the components of BMS 500 can be implemented as part of a cloud-based computing system configured to receive and process data from one or more building management systems. In other embodiments, some or all of the components of BMS 500 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building equipment.

BMS 500 can include many of the same components as BMS 400, as described with reference to FIG. 4. For example, BMS 500 is shown to include a BMS interface 502 and a communications interface 504. Interfaces 502-504 can include wired or wireless communications interfaces (e.g., jacks, antennas, transmitters, receivers, transceivers, wire terminals, etc.) for conducting data communications with building subsystems 428 or other external systems or devices. Communications conducted via interfaces 502-504 can be direct (e.g., local wired or wireless communications) or via a communications network 446 (e.g., a WAN, the Internet, a cellular network, etc.).

Communications interface 504 can facilitate communications between BMS 500 and external applications (e.g., remote systems and applications 444) for allowing user control, monitoring, and adjustment to BMS 500. Communications interface 504 can also facilitate communications between BMS 500 and client devices 448. BMS interface 502 can facilitate communications between BMS 500 and building subsystems 428. BMS 500 can be configured to communicate with building subsystems 428 using any of a variety of building automation systems protocols (e.g., BACnet, Modbus, ADX, etc.). In some embodiments, BMS 500 receives data samples from building subsystems 428 and provides control signals to building subsystems 428 via BMS interface 502.

Building subsystems 428 can include building electrical subsystem 434, information communication technology (ICT) subsystem 436, security subsystem 438, HVAC subsystem 440, lighting subsystem 442, lift/escalators subsystem 432, and/or fire safety subsystem 430, as described with reference to FIG. 4. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3. Each of building subsystems 428 can include any number of devices, controllers, and connections for completing its individual functions and control activities. Building subsystems 428 can include building equipment (e.g., sensors, air handling units, chillers, pumps, valves, etc.) configured to monitor and control a building condition such as temperature, humidity, airflow, etc.

Still referring to FIG. 5, BMS 500 is shown to include a processing circuit 506 including a processor 508 and memory 510. Processor 508 can be a general purpose or specific purpose processor, an application specific integrated circuit (ASIC), one or more field programmable gate arrays (FPGAs), a group of processing components, or other suitable processing components. Processor 508 is configured to execute computer code or instructions stored in memory 510 or received from other computer readable media (e.g., CDROM, network storage, a remote server, etc.).

Memory 510 can include one or more devices (e.g., memory units, memory devices, storage devices, etc.) for storing data and/or computer code for completing and/or facilitating the various processes described in the present disclosure. Memory 510 can include random access memory (RAM), read-only memory (ROM), hard drive storage, temporary storage, non-volatile memory, flash memory, optical memory, or any other suitable memory for storing software objects and/or computer instructions. Memory 510 can include database components, object code components, script components, or any other type of information structure for supporting the various activities and information structures described in the present disclosure. Memory 510 can be communicably connected to processor 508 via processing circuit 506 and can include computer code for executing (e.g., by processor 508) one or more processes described herein. When processor 508 executes instructions stored in memory 510, processor 508 generally configures processing circuit 506 to complete such activities.

Still referring to FIG. 5, BMS 500 is shown to include a data collector 512. Data collector 512 is shown receiving data samples from building subsystems 428 via BMS interface 502. In some embodiments, the data samples include data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Data collector 512 can receive data samples from multiple different devices within building subsystems 428.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 500. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 512 adds timestamps to the data samples based on the times at which the data samples are received. Data collector 512 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 512 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, etc.), timestamp$_i$ identifies the time at which the ith sample was collected, and value$_i$ indicates the value of the ith sample.

Data collector 512 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 512 organizes the raw timeseries data. Data collector 512 can identify a system or device associated with each of the data points. For example, data collector 512 can associate a data point with a temperature sensor, an air handler, a chiller, or any other type of system or device. In various embodiments, data collector uses the name of the data point, a range of values of the data point, statistical characteristics of the data point, or other attributes of the data point to identify a particular system or device associated with the data point. Data collector 512 can then determine how that system or device relates to the other systems or devices in the building site. For example, data collector 512 can determine that the identified system or device is part of a larger system (e.g., a HVAC system) or serves a particular space (e.g., a particular building, a room or zone of the building, etc.). In some embodiments, data collector 512 uses or creates an entity graph when organizing the timeseries data.

Data collector 512 can provide the raw timeseries data to data platform services 520 and/or store the raw timeseries data in local storage 514 or hosted storage 516. As shown in FIG. 5, local storage 514 can be data storage internal to BMS 500 (e.g., within memory 510) or other on-site data storage local to the building site at which the data samples are collected. Hosted storage 516 can include a remote database, cloud-based data hosting, or other remote data storage. For example, hosted storage 516 can include remote data storage located off-site relative to the building site at which the data samples are collected. Local storage 514 and hosted storage 516 can be configured to store the raw timeseries data obtained by data collector 512, the derived timeseries data generated by data platform services 520, and/or directed acyclic graphs (DAGs) used by data platform services 520 to process the timeseries data.

Still referring to FIG. 5, BMS 500 is shown to include data platform services 520. Data platform services 520 can receive the raw timeseries data from data collector 512 and/or retrieve the raw timeseries data from local storage 514 or hosted storage 516. Data platform services 520 can include a variety of services configured to analyze, process, and transform the raw timeseries data. For example, data platform services 520 are shown to include a security service 522, an analytics service 524, an entity service 526, and a timeseries service 528. Security service 522 can assign security attributes to the raw timeseries data to ensure that the timeseries data are only accessible to authorized individuals, systems, or applications. Entity service 526 can assign entity information to the timeseries data to associate data points with a particular system, device, or space. Timeseries service 528 and analytics service 524 can apply various transformations, operations, or other functions to the raw timeseries data to generate derived timeseries data.

In some embodiments, timeseries service 528 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 528 provide an efficient mechanism for applications 530 to query the timeseries data. For example, applications 530 can construct visualizations of the timeseries data (e.g., charts, graphs, etc.) using the pre-aggregated data rollups instead of the raw timeseries data. This allows applications 530 to simply retrieve and present the pre-aggregated data rollups without requiring applications 530 to perform an aggregation in response to the query. Since the data rollups are pre-aggregated, applications 530 can present the data rollups quickly and efficiently without requiring additional processing at query time to generate aggregated timeseries values.

In some embodiments, timeseries service 528 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 528 can calculate a virtual data point (pointID$_3$) by adding two or more actual data points (pointID$_1$ and pointID$_2$) (e.g., pointID$_3$=pointID$_1$+pointID$_2$). As another example, timeseries service 528 can calculate an enthalpy data point (pointID$_4$) based on a measured temperature data point (pointID$_5$) and a measured pressure data point (pointID$_6$)

(e.g., pointID$_4$=enthalpy(pointID$_5$, pointID$_6$)). The virtual data points can be stored as derived timeseries data.

Applications 530 can access and use the virtual data points in the same manner as the actual data points. Applications 530 do not need to know whether a data point is an actual data point or a virtual data point since both types of data points can be stored as derived timeseries data and can be handled in the same manner by applications 530. In some embodiments, the derived timeseries are stored with attributes designating each data point as either a virtual data point or an actual data point. Such attributes allow applications 530 to identify whether a given timeseries represents a virtual data point or an actual data point, even though both types of data points can be handled in the same manner by applications 530. These and other features of timeseries service 528 are described in greater detail with reference to FIG. 6.

In some embodiments, analytics service 524 analyzes the raw timeseries data and/or the derived timeseries data to detect faults. Analytics service 524 can apply a set of fault detection rules to the timeseries data to determine whether a fault is detected at each interval of the timeseries. Fault detections can be stored as derived timeseries data. For example, analytics service 524 can generate a new fault detection timeseries with data values that indicate whether a fault was detected at each interval of the timeseries. The fault detection timeseries can be stored as derived timeseries data along with the raw timeseries data in local storage 514 or hosted storage 516.

Still referring to FIG. 5, BMS 500 is shown to include several applications 530 including an energy management application 532, monitoring and reporting applications 534, and enterprise control applications 536. Although only a few applications 530 are shown, it is contemplated that applications 530 can include any of a variety of applications configured to use the derived timeseries generated by data platform services 520. In some embodiments, applications 530 exist as a separate layer of BMS 500 (i.e., separate from data platform services 520 and data collector 512). This allows applications 530 to be isolated from the details of how the derived timeseries are generated. In other embodiments, applications 530 can exist as remote applications that run on remote systems or devices (e.g., remote systems and applications 444, client devices 448).

Applications 530 can use the derived timeseries data to perform a variety data visualization, monitoring, and/or control activities. For example, energy management application 532 and monitoring and reporting application 534 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point. Several examples of user interfaces that can be generated based on the derived timeseries data are described in U.S. patent application Ser. No. 15/182,579 filed Jun. 14, 2016, and U.S. Provisional Patent Application No. 62/446,284 filed Jan. 13, 2017. The entire disclosures of both these patent applications are incorporated by reference herein.

Enterprise control application 536 can use the derived timeseries data to perform various control activities. For example, enterprise control application 536 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 428. In some embodiments, building subsystems 428 use the control signals to operate building equipment. Operating the building equipment can affect the measured or calculated values of the data samples provided to BMS 500. Accordingly, enterprise control application 536 can use the derived timeseries data as feedback to control the systems and devices of building subsystems 428.

Timeseries Data Platform Service

Figure 6:
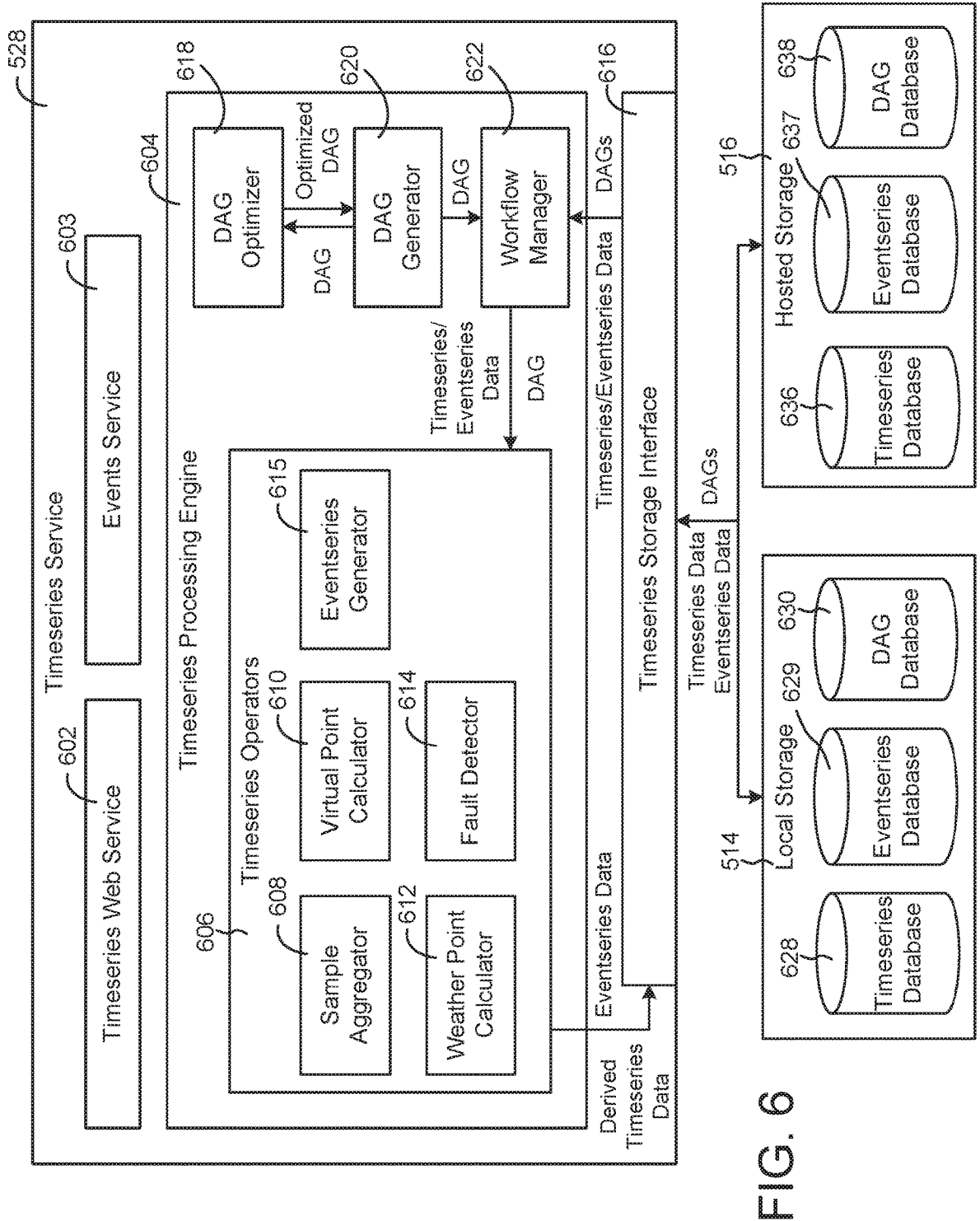
FIG. 6 is a block diagram of a timeseries service which can be implemented as some of the data platform services shown in FIG. 5, according to some embodiments.

Referring now to FIG. 6, a block diagram illustrating timeseries service 528 in greater detail is shown, according to some embodiments. Timeseries service 528 is shown to include a timeseries web service 602, an events service 603, a timeseries processing engine 604, and a timeseries storage interface 616. Timeseries web service 602 can be configured to interact with web-based applications to send and/or receive timeseries data. In some embodiments, timeseries web service 602 provides timeseries data to web-based applications. For example, if one or more of applications 530 are web-based applications, timeseries web service 602 can provide derived timeseries data and raw timeseries data to the web-based applications. In some embodiments, timeseries web service 602 receives raw timeseries data from a web-based data collector. For example, if data collector 512 is a web-based application, timeseries web service 602 can receive data samples or raw timeseries data from data collector 512.

Timeseries storage interface 616 can be configured to store and read samples of various timeseries (e.g., raw timeseries data and derived timeseries data) and eventseries (described in greater detail below). Timeseries storage interface 616 can interact with local storage 514 and/or hosted storage 516. For example, timeseries storage interface 616 can retrieve timeseries data from a local timeseries database 628 within local storage 514 or from a hosted timeseries database 636 within hosted storage 516. In some embodiments, timeseries storage interface 616 reads samples from a specified start time or start position in the timeseries to a specified stop time or a stop position in the timeseries. Similarly, timeseries storage interface 616 can retrieve eventseries data from a local eventseries database 629 within local storage 514 or from a hosted eventseries database 637 within hosted storage 516. Timeseries storage interface 616 can also store timeseries data in local timeseries database 628 or hosted timeseries database 636 and can store eventseries data in local eventseries database 629 or hosted eventseries database 637. Advantageously, timeseries storage interface 616 provides a consistent interface which enables logical data independence.

In some embodiments, timeseries storage interface 616 stores timeseries as lists of data samples, organized by time. For example, timeseries storage interface 616 can store timeseries in the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, etc.), timestamp$_i$ identifies a time associated with the ith sample, and value$_i$ indicates the value of the ith sample.

In some embodiments, timeseries storage interface 616 stores eventseries as lists of events having a start time, an end time, and a state. For example, timeseries storage interface 616 can store eventseries in the following format:

[<eventID$_1$, start_timestamp$_1$, end_timestamp$_1$, state$_1$>, ..., <eventID$_N$, start_timestamp$_N$, end_timestamp$_N$, state$_N$>]

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, timeseries storage interface 616 stores timeseries and eventseries in a tabular format. Timeseries storage interface 616 can store timeseries and eventseries in various tables having a column for each attribute of the timeseries/eventseries samples (e.g., key, timestamp, value). The timeseries tables can be stored in local timeseries database 628 and/or hosted timeseries database 636, whereas the eventseries tables can be stored in local eventseries database 629 and/or hosted eventseries database 637. In some embodiments, timeseries storage interface 616 caches older data to local storage 514 or hosted storage 516 but stores newer data in RAM. This may improve read performance when the newer data are requested for processing.

In some embodiments, timeseries storage interface 616 omits one or more of the attributes when storing the timeseries samples. For example, timeseries storage interface 616 may not need to repeatedly store the key or timeseries ID for each sample in the timeseries. In some embodiments, timeseries storage interface 616 omits timestamps from one or more of the samples. If samples of a particular timeseries have timestamps at regular intervals (e.g., one sample each minute), timeseries storage interface 616 can organize the samples by timestamps and store the values of the samples in a row. The timestamp of the first sample can be stored along with the interval between the timestamps. Timeseries storage interface 616 can determine the timestamp of any sample in the row based on the timestamp of the first sample and the position of the sample in the row.

In some embodiments, timeseries storage interface 616 stores one or more samples with an attribute indicating a change in value relative to the previous sample value. The change in value can replace the actual value of the sample when the sample is stored in local timeseries database 628 or hosted timeseries database 636. This allows timeseries storage interface 616 to use fewer bits when storing samples and their corresponding values. Timeseries storage interface 616 can determine the value of any sample based on the value of the first sample and the change in value of each successive sample.

In some embodiments, timeseries storage interface 616 creates containers or data objects in which samples of timeseries data and/or eventseries data can be stored. The containers can be JSON objects or other types of containers configured to store one or more timeseries samples and/or eventseries samples. Timeseries storage interface 616 can be configured to add samples to the containers and read samples from the containers. For example, timeseries storage interface 616 can receive a set of samples from data collector 512, timeseries web service 602, events service 603, and/or timeseries processing engine 604. Timeseries storage interface 616 can add the set of samples to a container and send the container to local storage 514 or hosted storage 516.

Timeseries storage interface 616 can use containers when reading samples from local storage 514 or hosted storage 516. For example, timeseries storage interface 616 can retrieve a set of samples from local storage 514 or hosted storage 516 and add the samples to a container. In some embodiments, the set of samples include all samples within a specified time period (e.g., samples with timestamps in the specified time period) or eventseries samples having a specified state. Timeseries storage interface 616 can provide the container of samples to timeseries web service 602, events service 603, timeseries processing engine 604, applications 530, and/or other components configured to use the timeseries/eventseries samples.

Still referring to FIG. 6, timeseries processing engine 604 is shown to include several timeseries operators 606. Timeseries operators 606 can be configured to apply various operations, transformations, or functions to one or more input timeseries to generate output timeseries and/or eventseries. The input timeseries can include raw timeseries data and/or derived timeseries data. Timeseries operators 606 can be configured to calculate aggregate values, averages, or apply other mathematical operations to the input timeseries. In some embodiments, timeseries operators 606 generate virtual point timeseries by combining two or more input timeseries (e.g., adding the timeseries together), creating multiple output timeseries from a single input timeseries, or applying mathematical operations to the input timeseries. In some embodiments, timeseries operators 606 perform data cleansing operations or deduplication operations on an input timeseries. In some embodiments, timeseries operators 606 use the input timeseries to generate eventseries based on the values of the timeseries samples. The output timeseries can be stored as derived timeseries data in local storage 514 and/or hosted storage 516. Similarly, the eventseries can be stored as eventseries data in local storage 514 and/or hosted storage 516.

In some embodiments, timeseries operators 606 do not change or replace the raw timeseries data, but rather generate various "views" of the raw timeseries data. The views can be queried in the same manner as the raw timeseries data. For example, samples can be read from the raw timeseries data, transformed to create the view, and then provided as an output. Because the transformations used to create the views can be computationally expensive, the views can be stored as "materialized views" in local timeseries database 628 or hosted timeseries database 636. These materialized views are referred to as derived timeseries data throughout the present disclosure.

Timeseries operators 606 can be configured to run at query time (e.g., when a request for derived timeseries data is received) or prior to query time (e.g., when new raw data samples are received, in response to a defined event or trigger, etc.). This flexibility allows timeseries operators 606 to perform some or all of their operations ahead of time and/or in response to a request for specific derived data timeseries. For example, timeseries operators 606 can be configured to pre-process one or more timeseries that are read frequently to ensure that the timeseries are updated whenever new data samples are received. However, timeseries operators 606 can be configured to wait until query time to process one or more timeseries that are read infrequently to avoid performing unnecessary processing operations.

In some embodiments, timeseries operators 606 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries).

The DAGs can be stored in a local DAG database 630 within local storage 514, in a hosted DAG database 638 within hosted storage 516, or internally within timeseries processing engine 604. DAGs can be retrieved by workflow manager 622 and used to determine how and when to process incoming data samples. Exemplary systems and methods for creating and using DAGs are described in greater detail below.

Timeseries operators 606 can perform aggregations for dashboards, cleansing operations, logical operations for rules and fault detection, machine learning predictions or classifications, call out to external services, or any of a variety of other operations which can be applied to timeseries data. The operations performed by timeseries operators 606 are not limited to sensor data. Timeseries operators 606 can also operate on event data or function as a billing engine for a consumption or tariff-based billing system.

Timeseries operators 606 are shown to include a sample aggregator 608, a virtual point calculator 610, a weather point calculator 612, a fault detector 614, and an eventseries generator 615. In some embodiments, timeseries operators 606 are configured to perform some or all of the functions described in U.S. Provisional Patent Application No. 62/457,654 filed Feb. 10, 2017, U.S. patent application Ser. No. 15/644,519 filed Jul. 7, 2017, U.S. patent application Ser. No. 15/644,560 filed Jul. 7, 2017, and/or U.S. patent application Ser. No. 15/644,581 filed Jul. 7, 2017. The entire disclosure of each of these patent applications is incorporated by reference herein.

Still referring to FIG. 6, timeseries processing engine 604 is shown to include a DAG optimizer 618. DAG optimizer 618 can be configured to combine multiple DAGs or multiple steps of a DAG to improve the efficiency of the operations performed by timeseries operators 606. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 618 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 618 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 618 schedules timeseries operators 606 to nodes where data is resident in memory in order to further reduce the amount of data required to be loaded from timeseries databases 628 and 636.

Timeseries processing engine 604 is shown to include a directed acyclic graph (DAG) generator 620. DAG generator 620 can be configured to generate one or more DAGs for each raw data timeseries. Each DAG may define a workflow or sequence of operations which can be performed by timeseries operators 606 on the raw data timeseries. When new samples of the raw data timeseries are received, workflow manager 622 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 608 can use the DAG to identify the duration of the time window (e.g., an hour, a day, a week, etc.) over which the data aggregation operation will be performed. Sample aggregator 608 can use the timestamps of the data samples in the timeseries provided as an input to the DAG to identify the location of the time window (i.e., the start time and the end time). Sample aggregator 608 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Identity Management Using Smart Entities

Figure 7:
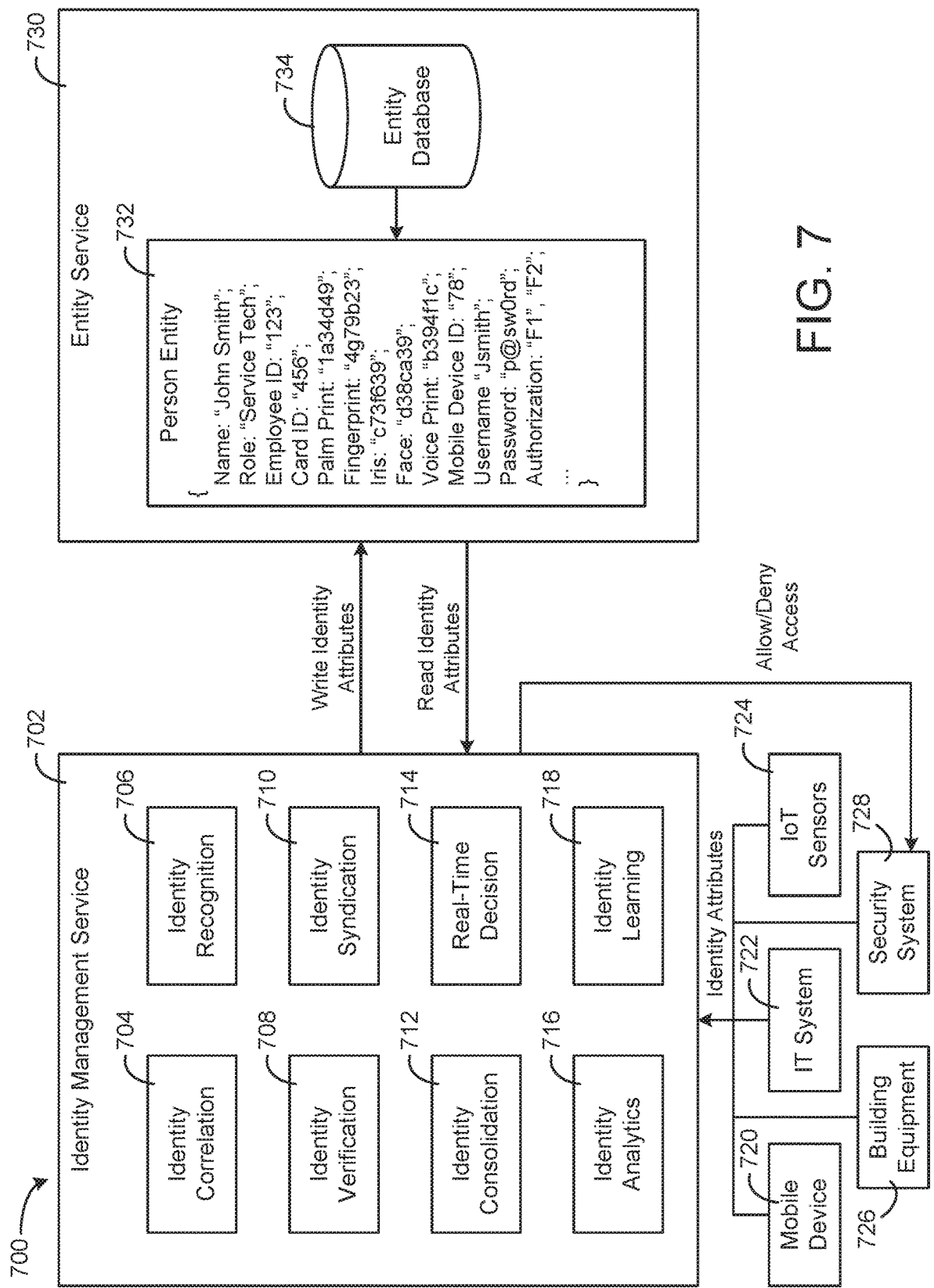
FIG. 7 is a block diagram of an identity management system including an identity management service and an entity service, according to some embodiments.

Referring now to FIG. 7, a block diagram of an identity management system 700 is shown, according to an exemplary embodiment. Identity management system 700 is shown to include an identity management service 702 and an entity service 730. In some embodiments, identity management service 702 and entity service 730 are types of data platform services 520 within building management system 500. In some embodiments, identity management service 702 and entity service 730 include some or all of the features and/or functionality of the data platform described in U.S. Provisional Patent Application No. 62/564,247 filed Sep. 27, 2017, the entire disclosure of which is incorporated by reference herein. Identity management service 702 can be configured to perform various identity management functions. For example, identity management service 702 is shown to include an identity correlation module 704, an identity recognition module 706, an identity verification module 708, an identity syndication module 710, an identity consolidation module 712, a real-time decision making module 714, an identity analytics module 716, and an identity learning module 718. In various implementations, identity management service 702 can include fewer, additional, or different modules than illustrated in FIG. 7.

Entity service 730 may be the same as or similar to entity service 526 shown in FIG. 5. Entity service 730 can be configured to generate and manage a plurality of interconnected smart entities and store the smart entities in entity database 734. The smart entities may include object entities representing a plurality of people or physical devices and data entities representing data associated with the people or physical devices. The smart entities may be interconnected by relational objects indicating relationships between the object entities and the data entities. In some embodiments, each of the object entities includes a plurality of stored identity attributes. In some embodiments, entity service 730 performs some or all of the the smart entity creation and management functions described in detail in U.S. Provisional Patent Application No. 62/611,974 filed Dec. 29, 2017, and U.S. Provisional Patent Application No. 62/611, 984 filed Dec. 29, 2017, the entire disclosures of which are incorporated by reference herein.

Modules 704-718 can be configured to receive and consolidate identity attributes to generate an entity representing a person (i.e., person entity 732). In some embodiments, person entity 732 is a type of object entity stored in entity database 734. The identity attributes can be received from various systems or devices including, for example, a mobile device 720, an information technology (IT) system 722, internet of things (IoT) sensors 724, building equipment 726, and a security system 728. Identity attributes from mobile device 720 may include a mobile device ID (e.g., a MAC address, a Wi-Fi address, a device serial number, etc.), biometric attributes collected by mobile device 720 (e.g., a fingerprint, a voice print, an iris scan, a face scan, etc.), data from mobile device 720 uniquely identifying a user (e.g., a login identity to which the user has authenticated on the mobile device, such as a logged-in identity from an application or website/web portal), or other attributes uniquely identifying a particular mobile device or user associated with a mobile device. Identity attributes from IT system 722 may include a person's username, password, access privileges, human resources ID, directory ID, telephone number, office location, role, authorized areas, or other attributes associated with a particular user profile managed by IT system 722. Identity attributes from sensors such as IoT sensors 724 may include images/video from cameras, data from biometric sensors, data collected by wearable devices (e.g., skin temperature, heartbeat, movement, etc.) or other attributes that are associated with a user and may be used, alone or in combination with other attributes, to confirm the identity of the user. Identity attributes from building equipment 726 and security system 728 may include a card ID, a fingerprint, a face scan, an iris scan, images/video from cameras, or other types of identifying information. In some embodiments, some or all of the attributes are stored in an encrypted form to prevent access of private attributes by unauthorized parties/systems. In some such embodiments, the system does not allow for access of the attributes by external systems, but rather receives queries including data to be compared with the stored attributes and responds to the queries with response messages (e.g., indicating whether or not the data received with the queries matches the stored data, whether access should be granted or denied, etc.).

Identity management service 702 can consolidate and write identity attributes to person entity 732 to create a single entity (e.g., a data object or object entity) that includes all of the identity attributes associated with a particular person. Person entity 732 can be stored in an entity database 734 and accessed by identity management service 702 to perform various identity management functions such as identity recognition, real-time decision making (e.g., access control), identity analytics, and identity learning. Advantageously, person entity 732 is a smart entity that contains all of the identity attributes associated with a person regardless of the system or device from which the identity attributes were collected. This allows identity management service 702 to perform a variety of different identity management functions using only the information contained within person entity 732. Several examples of the functions performed by identity management service 702 are described in detail below.

In some embodiments, identity management service 702 uses person entity 732 and the identity attributes contained therein to recognize, verify, and/or authenticate a person's identity. For example, security system 728 can request authorization from identity management service 702 in response to a person scanning an access card at a card reader of security system 728. Security system 728 can read a card ID from the access card and provide the card ID to identity management service 702. Identity management service 702 can use the card ID to identify a particular person entity 732 that contains a card ID attribute matching the card ID received from security system 728. Identity management service 702 can read other attributes of person entity 732 to identify the person's authorization, access privileges, role, and the like. If the person is authorized to access a particular space associated with the card reader, identity management service 702 can send an "allow access" signal to security system 728 to allow the person to access the building space. Conversely, if the person is not authorized to access the space associated with the card reader, identity management service 702 can send a "deny access" signal to security system 728 to deny the person access to the building space.

In some embodiments, identity management service 702 uses multiple identity attributes of person entity 732 to perform multifactor authentication or identity verification. For example, identity management service 702 can receive a first identity attribute from one of mobile device 720, IT system 722, IoT sensors 724, building equipment 726, or security system 728. The first identity attribute can be any of the identity attributes stored in person entity 732 (e.g., name, role, employee ID, card ID, username, password, etc.). Identity management service 702 can use the first identity attribute to identify a particular person entity 732 that contains the first identity attribute. Identity management service 702 can then read a second identity attribute from person entity 732. The second identity attribute can be any of the identity attributes stored in person entity 732 (other than the first identity attribute).

Identity management service 702 can compare the second identity attribute with data obtained from one or more of mobile device 720, IT system 722, IoT sensors 724, building equipment 726, or security system 728 to determine whether the second identity attribute is also satisfied. In various embodiments, the second identity attribute can be collected automatically or provided by the person in response a prompt from identity management service 702. For example, if the first identity attribute is a card ID received from a card reader at a particular location within a building, the second identity attribute may be an image of a person collected by a camera at the same location as the card reader or a mobile device ID broadcast by a mobile device at the same location as the card reader. If the second identity attribute is also satisfied (i.e., the second identity attribute matches an identity attribute in the same person entity 732 as the first identity attribute), identity management service 702 may allow access or report a successful identity verification or authorization.

In some embodiments, identity management service 702 uses the identity attributes stored in person entity 732 to automatically grant a person access to a system, device, or space within a building without requiring the person to actively scan an ID card or enter a username or password. For example, identity management service 702 can track the locations of people within a building using location data reported by mobile devices 720 carried by the people, IoT sensor data provided by IoT sensors 724, and/or camera data from security system 728. Several examples of systems and methods for determining the locations of people within a building are described in detail in U.S. patent application Ser. No. 14/263,639 filed Apr. 28, 2014, the entire disclosure of which is incorporated by reference herein.

Identity management service 702 can use the identity attributes stored in person entity 732 to determine the authorization of each person. For example, person entity 732 may identify one or more building spaces (e.g., floors, rooms, zones, etc.), systems (e.g., HVAC systems, security systems, lighting systems, etc.), or devices (e.g., HVAC devices, lighting devices, card readers, etc.) that the person is authorized to access. In some embodiments, person entity 732 identifies the person's role (e.g., service technician, office administrator, nurse, etc.) and identity management service 702 automatically determines the person's authorization based on the identified role.

Identity management service 702 can use the location information for a person in the building to determine whether the person is approaching an access point (e.g., a door, entrance, exit, etc.). If the identity attributes in the corresponding person entity 732 for that person indicate that the person is authorized to pass through the access point, identity management service 702 can automatically open or unlock the access point to allow the person access without requiring the person to scan an ID card or enter a key code at the access point. In some embodiments, identity management service 702 automatically opens or unlocks the access point before the person reaches the access point (e.g., while the user is approaching the access point) to prevent any delay upon reaching the access point.

Similarly, identity management service 702 can use the location information for a person in the building to determine whether the person is located at a computer workstation, IT system, a particular device of building equipment, or other IT access point. If the identity attributes in the corresponding person entity 732 for that person indicate that the person is authorized to access a system or device via the IT access point, identity management service 702 can automatically login the person or provide access to the building equipment to allow access without requiring the person to enter a username, password, or other login credential. In some embodiments, identity management service 702 automatically logs the person into the IT access point before the person reaches the IT access point (e.g., while the user is approaching the IT access point) to prevent any delay upon reaching the IT access point.

In some embodiments, identity management service 702 uses multifactor authentication to verify the person's identity before allowing access. For example, identity management service 702 can collect two or more identity attributes from mobile device 720, IT system 722, IoT sensors 724, building equipment 726, or security system 728 at the location of a person. If all of the identity attributes match the same person entity 732, identity management service 702 can confirm that the person's identity has been verified using multiple identity attributes. Identity management service 702 can then automatically open or unlock a physical access point or provide access to an IT access point upon successful multifactor authentication or verification. In some embodiments, identity management service 702 may utilize attributes from two separate systems to increase security (e.g., one data item from mobile device 720 and another item from building equipment 726 or security system 728). This may help prevent against unauthorized access in the event the security of one of the devices is compromised.

Assurance Service

Figure 8:
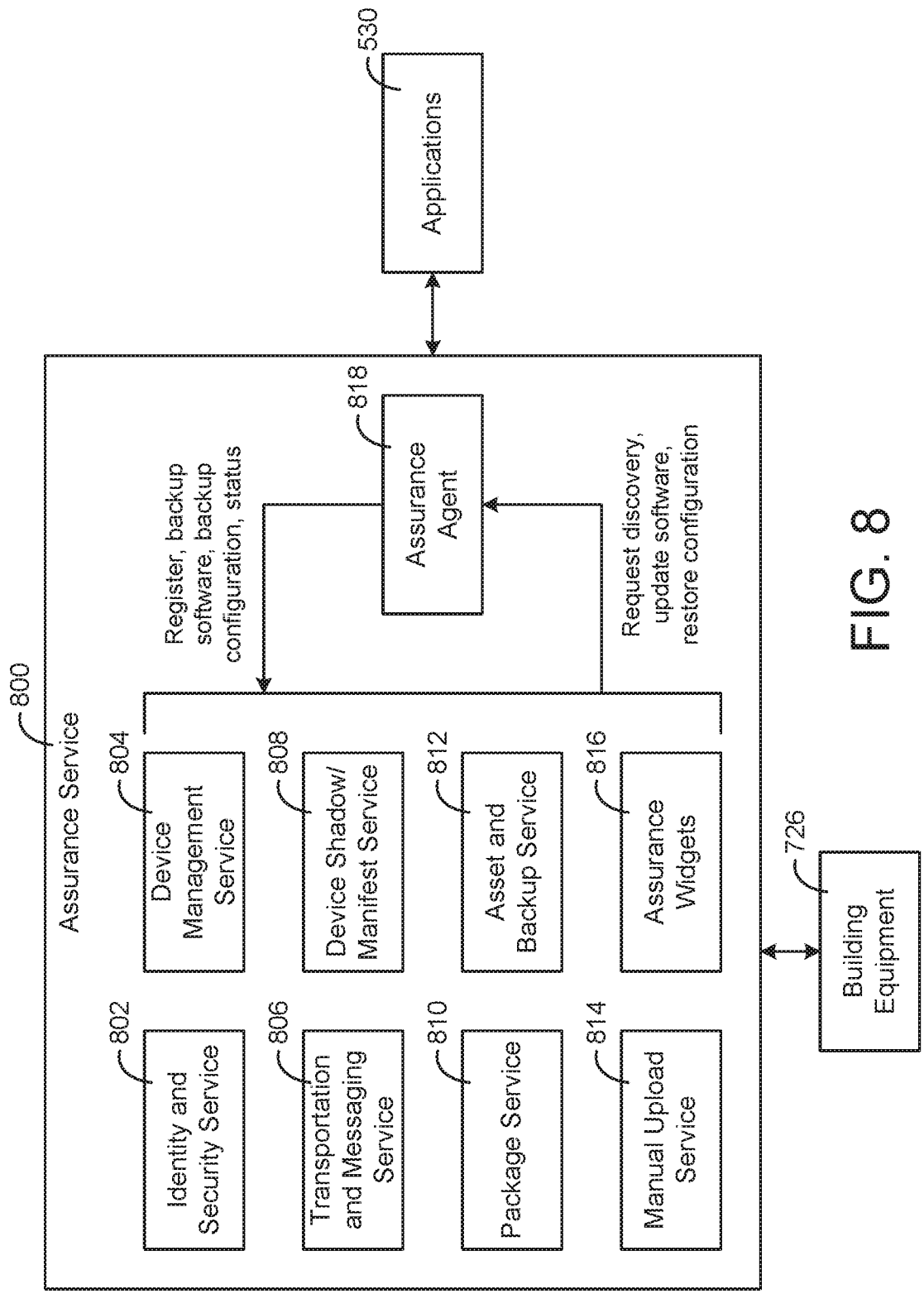
FIG. 8 is a block diagram of an assurance service, according to some embodiments.

Referring now to FIG. 8, a block diagram of an assurance service 800 is shown, according to an exemplary embodiment. In some embodiments, assurance service 800 is one of data platform services 520 within building management system 500. In some embodiments, assurance service 800 includes some or all of the features and/or functionality of the data platform described in U.S. Patent Application No. 62/564,247 filed Sep. 27, 2017, the entire disclosure of which is incorporated by reference herein. Assurance service 800 can be configured to perform device health monitoring and on-demand, offline, and online asset management through IoT technologies. Assurance service 800 is shown to include an identity and security service 802, a device management service 804, a transportation and messaging service 806, a device shadow/manifest service 808, a package service 810, an asset and backup service 812, a manual upload service 814, assurance widgets 816, and an assurance agent 818.

Identity and security service 802 can be configured to ensure that each device of building equipment 726 and user has the ability to access configuration backups. For example, identity and security service 802 can monitor identity and authorization attributes associated with each user and with each device of building equipment 726 and can determine whether the set of identity and authorization attributes are sufficient to access configuration backups. Identity and security service 802 can also ensure that each user has the ability to command building equipment 726. In some embodiments, identity and security service 802 includes some or all of the features or functionality of identity management service 702, as described with reference to FIG. 7.

Device management service 804 can perform secure device registration. For example, device management service 804 can communicate with building equipment 726 installed at a customer site to register each device of building equipment 726 with data platform services 520. In some embodiments, the device registration performed by device management service 804 is the same as or similar to the device registration described in U.S. patent application Ser. No. 15/639,880 filed Jun. 30, 2017, the entire disclosure of which is incorporated by reference herein. For example, device management service 804 can be configured to create a virtual representation of each device of building equipment 726 within data platform services 520. In some embodiments, the virtual device representations are smart entities that include attributes characterizing the corresponding physical devices of building equipment 726. Device management service 804 can associate each device of building equipment 726 with a particular customer, department, and/or user. Device management service 804 can send and request firmware updates on-demand when building equipment 726 are connected.

Transportation and messaging service 806 can be configured to facilitate bidirectional communications between assurance service and building equipment 726 installed at a customer site. In some embodiments, transportation and messaging service 806 provides real-time alarm and event messaging. For example, transportation and messaging service 806 can provide alarms or events from building equipment 726 to data platform services 520 in real time. Transportation and messaging service 806 can also provide real-time command and control functionality for building equipment 726. For example, transportation and messaging service 806 can provide commands and control signals from applications 530 or data platform services 520 to building equipment 726 in real-time. In some embodiments, transportation and messaging service 806 is configured to discover building equipment 726 and request firmware upgrades for building equipment 726.

Device shadow/manifest service 808 can be configured to synchronize configuration settings, parameters, and other device-specific information between building equipment 726 and data platform services 520. In some embodiments, the synchronization occurs asynchronously. Device shadow/manifest service 808 can be configured to manage device properties dynamically. The device properties, configuration settings, parameters, and other device-specific information can be synchronized between building equipment 726 and the smart entities created by and stored within data platform services 520. In some embodiments, device shadow/manifest service 808 is configured to monitor the health of building equipment 726 and perform on-demand, online, or offline asset management through IoT technologies.

In some embodiments, device shadow/manifest service 808 is configured to manage a manifest for each device of building equipment 726. The manifest may include a set of relationships between building equipment 726 and various entities and/or the various entities and other entities. Further, the manifest may indicate a set of entitlements for the device of building equipment 726 and/or entitlements of the various entities and/or other entities. The set of entitlements may allow a device of building equipment 726 and/or a user of the device to perform certain actions with building equipment 726 such as adjusting a temperature setpoint, turning a connected system on and/or off, running certain pieces of software, requesting software updates, etc. In some embodiments, the entity is at least one of a group (e.g., a technician group, a home residents group, a guest group, a building manager group, etc.), a user (e.g., Technician Bill, Dad, User A, User B, etc.), and a device (Mobile Device 1, Smartphone A, Computer 4, Actuator 9, etc.).

Package service 810 can be configured to identify software releases published by a developer or vendor of building equipment 726. For example, package service 810 can monitor a remote system or server for new versions of software for building equipment 726. When a new software version is available, package service 810 may generate an alert or notification. In some embodiments, package service 810 compares the installed version of software on building equipment 726 with the version of software available at the remote system or server to determine whether the software version is new relative to the installed version. In some embodiments, package service 810 can push the configurations of building equipment 726 as a compressed data object that will be stored reliably and securely at data platform services 520.

In some embodiments, package service 810 is configured to install, backup, and restore device configurations, device parameters, device software, or other adjustable parameters of building equipment 726. For example, package service 810 can perform on-demand, offline, and online backups of device configurations and released software packages. Package service 810 can perform remote provisioning of building equipment 726 and can perform version control for backup configurations and software. Package service 810 can handle ownership and replacement of each device of building equipment 726 with new devices.

Asset and backup service 812 can be configured to connect to applications 530 to facilitate communication between assurance service 800 and applications 530. For example, asset and backup service 812 can interface with monitoring and reporting service 534 to generate and present a user interface that lists all of the assets (i.e., devices of building equipment 726) installed at a customer site or facility. In some embodiments, the user interface identifies each asset and indicates whether the configuration of the asset has been backed up at data platform services 520.

Manual upload service 814 can be configured to perform a manual backup of device configuration parameters, software, firmware, and other adjustable settings for building equipment 726. The manual backup may be the same as or similar to the automatic backups performed by other components of assurance service 800. However, the manual backups can be triggered on-demand by a service technician or other user. In some embodiments, manual upload service 814 is configured to manually register a device of building equipment 726 with data platform services 520 and can upload various types of data associated with the registered device. For example, manual upload service 814 can upload a heartbeat timeseries that indicates whether the device is online and communicating, logs collected by the device, and/or configuration settings for the device.

Assurance widgets 816 can be configured to generate various user interface elements (i.e., widgets) that include information associated with devices of building equipment 726 and/or assurance service 800. The widgets may function as extensions or components of user interfaces generated by applications 530. For example, the widgets can include a list view of connected assets including asset details and an indication of whether a backup for each asset exists on data platform services 520. Assurance widgets 816 can remotely operate building equipment 726. For example, assurance widgets 816 can send a remote update request to building equipment 726 and can send registered commands to building equipment 726 securely. Assurance widgets 816 can also display real-time alarm and event data from building equipment 726.

Assurance agent 818 can be configured to interface with services 802-814, assurance widgets 816, and building equipment 726. In some embodiments, assurance agent 818 is configured to register building equipment 726, backup software and configuration settings, and communicate status information to services 802-814 and assurance widgets 816. Assurance agent 818 can send a request to building equipment 726 to perform a device discovery process to identify all of the devices of building equipment 726 located at the customer site. An example of a device discovery process which can be triggered by assurance agent 818 is described in detail in U.S. patent application Ser. No. 15/179,894 filed Jun. 10, 2016, the entire disclosure of which is incorporated by reference herein. Assurance agent 818 can also update the software of building equipment 726 and restore the configuration settings of building equipment 726. Assurance agent 818 can send device heartbeat timeseries, send logs, send configuration settings, send alerts, and relay commands to and from building equipment 726.

In some embodiments, assurance agent 818 uses the data stored in entity database 734 to perform its various functions. As described above, entity database 732 may store a plurality of interconnected smart entities. The smart entities may include object entities representing the plurality of devices of building equipment and data entities representing data associated with the plurality of devices of building equipment. The smart entities may be interconnected by relational objects indicating relationships between the object entities and the data entities. Each object entity may include a stored attribute indicating a version of software installed on a device of the building equipment represented by the object entity.

Assurance agent 818 can be configured to automatically detect a version of software installed on each of the devices of building equipment by reading the stored attributes of the object entities in entity database 734. Assurance agent 818 can automatically update the software installed on one or more of the devices of building equipment in response to a determination that the version of software installed on the one or more of the devices of building equipment is not a latest version of the software.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building identity system of a building comprising one or more storage devices configured to store:
    an entity graph, the entity graph including a plurality of entities and a plurality of relationships between the plurality of entities, wherein the plurality of entities include an entity representing a user or a device, wherein the entity graph further includes a first identity attribute of the entity associated with a first system of the building and a second identity attribute of the entity associated with a second system of the building; and
    instructions that, when executed by one or more processors, cause the one or more processors to:
        read at least one of the first identity attribute or the second identity attribute from the entity graph; and
        manage identity verification for the user or the device for at least one of the first system of the building or the second system of the building based on at least one of the first identity attribute or the second identity attribute.

2. The building identity system of claim 1, wherein the instructions cause the one or more processors to:
    receive a first value of the first identity attribute from a first device within the building;
    receive a second value of the second identity attribute from a second device within the building;
    compare the first value of the first identity attribute and the second value of the second identity attribute to the first identity attribute and the second identity attribute stored by the entity graph; and allow access to at least one of a building space, a device of building equipment, or a computer system in response to the first value matching the first identity attribute stored by the entity graph and the second value matching the second identity attribute stored by the entity graph.

3. The building identity system of claim 1, wherein:
the first system is an access card reader and the first identity attribute is a card identity attribute recorded by the access card reader; and
the second system is a security camera and the second identity attribute is an image of a person captured by the security camera.

4. The building identity system of claim 1, wherein:
the first system is an access card reader and the first identity attribute is a card identity attribute recorded by the access card reader; and
the second system is a mobile device carried by a person and the second identity attribute is a mobile device identity attribute associated with the mobile device.

5. The building identity system of claim 1, wherein:
the first system is a user interface device and the first identity attribute is a user identifier received from the user via the user interface device; and
the second system is a security camera and the second identity attribute is an image of a person captured by the security camera.

6. The building identity system of claim 1, wherein:
the first system is a user interface device and the first identity attribute is a user identifier received from the user via the user interface device; and
the second system is a mobile device carried by a person and the second identity attribute is a mobile device identity attribute associated with the mobile device.

7. The building identity system of claim 1, wherein:
the first system is one of a mobile device, an information technology (IT) device, an internet of things (IoT) sensor, a building equipment device, or a security device; and
the second system is another of the mobile device, the IT device, the IoT sensor, the building equipment device, or the security device.

8. The building identity system of claim 1, further comprising a plurality of devices of building equipment;
wherein the entity graph further includes an indication of a version of software installed on each of the plurality of devices of building equipment; and
wherein the instructions cause the one or more processors to:
detect the version of software installed on each of the plurality of devices of building equipment by reading the entity graph; and
update software installed on one or more of the plurality of devices of building equipment in response to a determination that the version of software installed on the one or more of the plurality of devices of building equipment is not a latest version of the software.

9. The building identity system of claim 8, wherein the instructions cause the one or more processors to create a smart entity for each of the plurality of devices of building equipment and register each of the plurality of devices of building equipment with a corresponding smart entity.

10. The building identity system of claim 8, wherein the instructions cause the one or more processors to create a compressed data object comprising a configuration of building equipment and store the compressed data object as a backup of the configuration.

11. The building identity system of claim 8, wherein the instructions cause the one or more processors to generate and present a user interface that lists each device of building equipment and indicates whether a backup configuration of each of the plurality of devices of building equipment has been stored.

12. A method of identity management, the method comprising:
storing, by one or more processing circuits, an entity graph in one or more storage devices, the entity graph including a plurality of entities and a plurality of relationships between the plurality of entities, wherein the plurality of entities include an entity representing a user or a device, wherein the entity graph further includes a first identity attribute of the entity associated with a first system of the building and a second identity attribute of the entity associated with a second system of the building;
reading, by the one or more processing circuits, at least one of the first identity attribute or the second identity attribute from the entity graph; and
managing, by the one or more processing circuits, identity verification for the user or the device for at least one of the first system of the building or the second system of the building based on at least one of the first identity attribute or the second identity attribute.

13. The method of claim 12, further comprising:
receiving, by the one or more processing circuits, a first value of the first identity attribute from a first device within the building;
receiving, by the one or more processing circuits, a second value of the second identity attribute from a second device within the building;
comparing, by the one or more processing circuits, the first value of the first identity attribute and the second value of the second identity attribute to the first identity attribute and the second identity attribute stored by the entity graph; and
allowing, by the one or more processing circuits, access to at least one of a building space, a device of building equipment, or a computer system in response to the first value matching the first identity attribute stored by the entity graph and the second value matching the second identity attribute stored by the entity graph.

14. The method of claim 12, wherein:
the first system is an access card reader and the first identity attribute is a card identity attribute recorded by the access card reader; and
the second system is a security camera and the second identity attribute is an image of a person captured by the security camera.

15. The method of claim 12, wherein:
the first system is an access card reader and the first identity attribute is a card identity attribute recorded by the access card reader; and
the second system is a mobile device carried by a person and the second identity attribute is a mobile device identity attribute associated with the mobile device.

16. The method of claim 12, wherein:
the first system is a user interface device and the first identity attribute is a user identifier received from the user via the user interface device; and the second system is a security camera and the second identity attribute is an image of a person captured by the security camera.

17. The method of claim 12, wherein:
the first system is a user interface device and the first identity attribute is a user identifier received from the user via the user interface device; and
the second system is a mobile device carried by a person and the second identity attribute is a mobile device identity attribute associated with the mobile device.

18. The method of claim 12, wherein:
the first system is one of a mobile device, an information technology (IT) device, an internet of things (IoT) sensor, a building equipment device, or a security device; and
the second system is another of the mobile device, the IT device, the IoT sensor, the building equipment device, or the security device.

19. An identity management system comprising one or more storage devices configured to store:
an entity graph, the entity graph including a plurality of entities and a plurality of relationships between the plurality of entities, wherein the plurality of entities include an entity representing a user or a device, wherein the entity graph further includes a first identity attribute of the entity associated with a first system of the building and a second identity attribute of the entity associated with a second system of the building; and
instructions that, when executed by one or more processors, cause the one or more processors to:
read at least one of the first identity attribute or the second identity attribute from the entity graph;
receive at least one of a first value of the first identity attribute from a first device within the building or a second value of the second identity attribute from a second device within the building; and
manage identity verification for the user or the device for at least one of the first system of the building or the second system of the building based on at least one of the first identity attribute or the second identity attribute and at least one of the first value of the first identity attribute or the second value of the second identity attribute.

20. The identity management system of claim 19, wherein the instructions cause the one or more processors to:
compare the first value of the first identity attribute and the second value of the second identity attribute to the first identity attribute and the second identity attribute stored by the entity graph; and
allow access to at least one of a building space, a device of building equipment, or a computer system in response to the first value matching the first identity attribute stored by the entity graph and the second value matching the second identity attribute stored by the entity graph.

* * * * *